United States Patent [19]
Boileau

[11] 3,830,273
[45] Aug. 20, 1974

[54] DUAL TIRE

[75] Inventor: Jacques Boileau, Clermont-Ferrand, France

[73] Assignee: Compagnie Generale Des Etablissements Michelin, raison sociale Michelin & Cie, Clermont-Ferrand (Puy-de-Dome), France

[22] Filed: June 1, 1973

[21] Appl. No.: 366,301

[30] Foreign Application Priority Data
June 5, 1972 France .............................. 72.20393

[52] U.S. Cl. .......... 152/352, 152/209 WT, 152/339
[51] Int. Cl. ........................ B60c 11/00, B60c 13/00
[58] Field of Search......... 152/209 R, 209 WT, 325, 152/328, 329, 331, 339, 352, 376

[56] References Cited
UNITED STATES PATENTS

| | | | |
|---|---|---|---|
| 1,678,211 | 7/1928 | Davidson | 152/352 |
| 2,680,464 | 6/1954 | Bonmartini | 152/352 |
| 2,990,869 | 7/1961 | Riley | 152/352 |

*Primary Examiner*—Drayton E. Hoffman
*Attorney, Agent, or Firm*—Brumbaugh, Graves, Donohue & Raymond

[57] ABSTRACT

A tire is formed with two treads spaced transversely from each other, two sidewalls terminating in beads reinforced with bead wires, and, between the treads, a connection comprising in its center a wire rod forming a closed loop of diameter intermediate between that of the bead wires and that of the treads. Each tread has its own independent reinforcement, and each sidewall has a rigid zone close to the bead and a flexible zone close to the tread. The connection has on opposite sides of the central wire rod substantially the same structure and the same equilibrium profile when the tire is inflated, and therefore the same radial flexibility, as the flexible zones of the two sidewalls.

7 Claims, 1 Drawing Figure

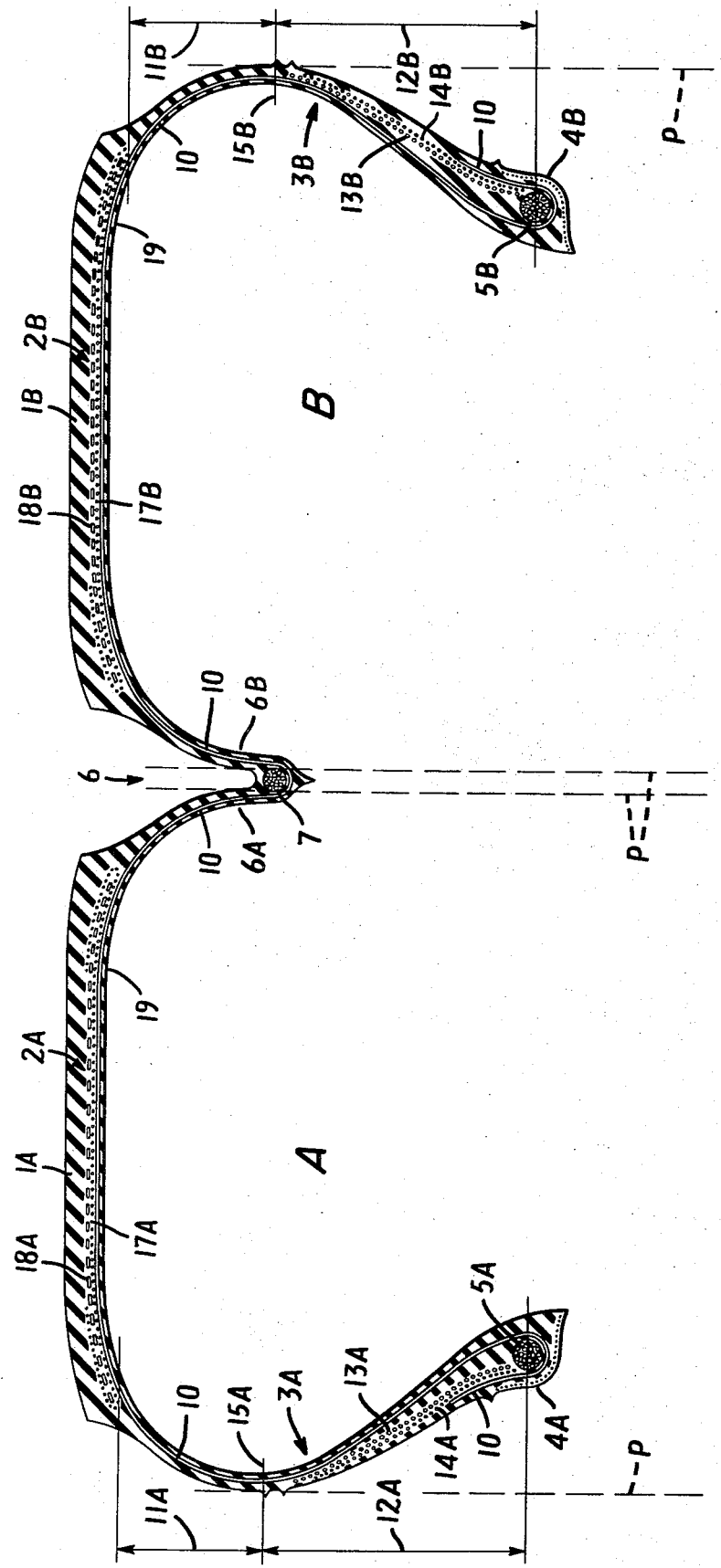

DUAL TIRE

BACKGROUND OF THE INVENTION

This invention relates to tires and, more particularly, to large tires having a large surface of contact with the ground.

In certain cases it is desirable that the area of contact of a tire with the ground be as large as possible and especially that the tread be very wide. This is true of course when it is desired to increase the load carried by the tire. It is also true of tires intended for very fast vehicles, for instance racing vehicles.

Very fast vehicles are conventionally equipped with tires having a very wide tread, since a large area of contact with the ground is necessary for them in order to withstand without slipping very high accelerating or braking torques and also in order to hold the road at high speed. However, an increase in the width of the tire tread beyond a certain point reduces adherence on a wet road at high speed. This reduction in adherence on a wet road occurs because the drainage grooves provided in the tread are no longer able to discharge with sufficient speed the film of water covering the contact area.

One possible way to obtain a large area of contact between the tires and the ground without excessively widening their treads would be to use twin tires. By distributing at each wheel the surface of contact with the ground over two narrower treads, satisfactory adherence at high speed can be obtained on both a dry road and a wet road. However, this solution has various drawbacks which make it undesirable for fast vehicles: namely, an increase in the weight of the wheel, the excessive space occupied by the wheel, the necessity of using special rims, and the less-favorable radial flexibility and road behavior of twin tires.

Another possible solution would be to divide the tread transversely into two sections or even into two separate treads spaced apart from each other and to provide a connecting member which is sufficiently reinforced to ensure a permanent spacing and a firm connection.

Such an arrangement, however, causes a concentration of stresses that result in premature failure of the tire. This structure furthermore adversely affects the behavior of the treads and is feasible only if the connecting zone is very near the area of contact with the ground and practically part of the tread. The improvement in the drainage of the contact area is then insignificant.

SUMMARY OF THE INVENTION

An object of the present invention is to provide a tire that has a large area of contact with the ground subdivided into a plurality of surfaces, that is not substantially heavier, bulkier or more rigid than a conventional wide tire, that can be mounted on conventional rims, and that has greatly improved adherence to wet roads at high speed and a behavior on dry roads similar to that of a tire having a single wide tread.

The foregoing and other objects are attained in accordance with the invention by a tire having at least two treads spaced transversely from each other, two sidewalls terminating in beads reinforced with bead wires, and, between two adjacent treads, a connection comprising at its center a wire rod extending in the circumferential direction of the tire and forming a closed loop of diameter intermediate between that of the bead wires and that of the treads. The tire is characterized in that 1. each tread has its own independent reinforcement,
2. each sidewall has a rigid region adjacent the nearer bead and a flexible region adjacent the nearer tread, and
3. each connection has on both sides of the central wire rod substantially the same structure and the same equilibrium profile in the inflated condition, and therefore the same flexibility, as the flexible zones of the two sidewalls.

Preferably, the tire has the following additional features:

*a.* The reinforcement of the flexible zones of the sidewalls and the reinforcement of the connection or connections are composed exclusively of cords or cables oriented radially; and the rigid zones of the sidewalls, like the treads, have an additional reinforcement which is specific to them.

*b.* Each connecting zone and each flexible zone of a sidewall have substantially the same radial height. This height is selected in such a manner that the meridian equilibrium profiles of the connecting zone and of the flexible zones of the sidewalls are tangent to planes perpendicular to the axis of the tire at points close to the radially inner ends of these zones.

*c.* The reinforcements of the treads have increased rigidity at their edges and comprise, for instance, at least one ply with folded edges.

The structure described produces in a single tire the desirable behavior of twin tires without the drawbacks thereof. The merging of twin tires is done moreover in a manner which makes the assembly feasible. In this respect the following observations are important:

*a.* The reinforcements of the treads should be maintained separate; they should not be connected by a special reinforcement or a common element.

*b.* Each half of the connecting zone should have a structure, a profile and an elasticity, when the tire is inflated, which are identical or very close to those of the flexible zones of the sidewalls; each tread is then fastened at its two edges to supports having the same elasticity. This is important for symmetrical behavior of each tread on the ground and also for a uniform level of stresses and deformation in the sidewalls on the one hand and in the connection on the other. In this respect, the additional reinforcement provided in the rigid zone of each sidewall acts in a manner similar to that of the wire rod provided at the center of the connecting zone.

The preferred additional features described above confer important advantages:

*a.* The selection of a radial carcass reinforcement is preferred since this type of carcass reinforcement is the strongest in proportion to the weight of material used and is the least subject to shearing forces. Moreover, with a radial carcass reinforcement, it is relatively easy to obtain uniformity of structure, profile and elasticity on each side of each tread. On the other hand, extensive differences in the angular arrangement of the cords or cables might occur on opposite sides of each tread if biased cables or cords were used.

*b.* The selection of a particular radial height for the connecting zone and the flexible zone of each sidewall produces the maximum radial flexibility for the tire and gives these zones identical equilibrium profiles when the tire is inflated.

c. The additional reinforcement of the tread reinforcement edges has the effect of impeding the formation of standing waves at high speed on both edges of each reinforcement, despite the great flexibility of the connecting zone.

Tests have shown that the structure in accordance with the invention produces good adherence at high speed both on dry roads and on wet roads. They have shown moreover that the tire in accordance with the invention is more flexible than a combination of two twin tires, because in particular it has only a single inner volume, subject in its entirety to the same inflation pressure. Moreover, where only one of the two treads passes over a bump, the two treads are not subjected to a difference in pressure. It has also been noted that the two treads move over the ground as though they were firmly connected and without developing excessive stresses in the connecting zone even at very high speeds. Finally—and this is surprising— the central wire rod or rods do not cause any imbalance or vibrations, although at high speed they assume an eccentric position like the treads and the sidewalls.

BRIEF DESCRIPTION OF THE DRAWING

A better understanding of the invention can be gained from the following detailed description of the preferred embodiment thereof in conjunction with the appended drawing, wherein the sole FIGURE is a view in cross section of a wide tire of size 390 × 15 with two treads in accordance with the invention.

DESCRIPTION OF THE PREFERRED EMBODIMENT

The tire shown has two halves A and B. The halves A and B are identical, except that they are reversed as mirror images. Each is asymmetrical, but they form a symmetrical whole. In particular, the tire comprises two identical treads 1A and 1B reinforced by identical reinforcements 2A and 2B. It furthermore comprises two sidewalls 3A and 3B terminating in two beads 4A and 4B, each containing a bead wire 5A and 5B. The two treads 1A and 1B are connected by a connection 6 comprising a wire rod 7 and two symmetrical portions 6A and 6B.

A carcass reinforcement comprising a ply 10 of textile cords arranged radially, that is to say, in the plane of the section shown in the figure, extends through the tire from bead to bead: i.e., from the bead wire 5A through the sidewall 3A and then under the tread 1A, along the connection 6 and around the wire rod 7, and then continues along a symmetrical path in half B of the tire.

Each sidewall 3A (or 3B) is divided into two portions: the one 11A (or 11B) is close to the tread and does not have any reinforcement other than the radial carcass ply 10. The other 12A (or 12B) has two additional reinforcement plies 13A and 14A (or 13B and 14B) of metal cables. The connecting point 15A (or 15B) between the two portions is located approximately at the same level as the center of the wire rod 7.

As can be noted, the portion 11A (or 11B) of each sidewall has the same structure and, except for symmetry, the same meridian profile as the portion 6A (or 6B) of the connection 6 which is part of the same half A or B of the tire. At the level of the center of the wire rod 7 or of the point 15A (or 15B), this meridian profile is tangent to a plane perpendicular to the axis of the tire. The outlines of such planes are shown in dashed lines P.

The tread reinforcements 2A and 2B are each formed of two plies of metal cables, one 17A (or 17B) of which has its edges folded around the other 18A (or 18B).

The tire has an inner airtight lining 19 so that it can be used without an inner tube.

The manufacture of a tire such as that shown is effected in a manner similar to the making of a conventional radial-carcass tire. The carcass is made on a tire building drum by successively laying down the inner lining 19, the carcass ply 10, the bead wires 5A and 5B, and the outer covering of the sidewalls. It is then partially shaped by inflation, whereupon the central wire rod 7 is placed around it in the plane of symmetry to limit its expansion. The carcass is further inflated to its final shape, and it then receives the two tread reinforcements and the treads themselves. The tire which has thus been made is then vulcanized in a mold.

The embodiment described concerns a tire having two symmetrical halves A and B. It goes without saying that one could use two different halves A and B, the halves differing in the shape of the tread moldings, in the width of the tread, in the profile of the carcass, or in the structure of the reinforcements, without thereby going beyond the scope of the invention. The essential factor is that in the two halves A or B the treads have the same diameter extended on each side by portions (sidewall or connecting section) having substantially the same structure, profile, and radial flexibility. Furthermore, it would be possible to insert between the two portions A and B a third portion resulting in a third tread and also having elements for connecting to the portions A and B. Many other embodiments within the scope of the invention will occur to those skilled in the art upon consideration of this disclosure. Accordingly, the invention is not limited except by the following claims.

I claim:

1. A pneumatic tire comprising at least two treads spaced transversely from each other, two beads, a bead wire reinforcing each bead, a sidewall extending between each bead and one of the treads, and, between the treads, a connection comprising in its center a wire rod extending in the circumferential direction of the tire and forming a closed loop of diameter intermediate between that of the bead wires and that of the treads, and a separate tread reinforcement in each tread, each sidewall having a relatively rigid zone close to the adjacent bead and a relatively flexible zone close to the adjacent tread, and the connection having on opposite sides of the central wire rod substantially the same equilibrium profile when the tire is inflated and the same radial flexibility as the flexible zones of the two sidewalls.

2. A pneumatic tire according to claim 1 further comprising a radial carcass reinforcement extending through the tire from bead to bead, the connection and the flexible zones of the sidewalls being substantially free of additional reinforcement.

3. A pneumatic tire according to claim 1 wherein the connection and the flexible zone of each sidewall have substantially the same radial height.

4. A pneumatic tire according to claim 1 wherein the radial height of the connection and of the flexible zone of each sidewall is such that the meridian profiles of the connection and of the flexible zones of the sidewalls are tangent to planes perpendicular to the axis of the tire at points close to the radially inner ends of said connection and flexible zones.

5. A pneumatic tire according to claim 1 wherein the reinforcement of each tread has increased rigidity at its edges.

6. A pneumatic tire according to claim 1 wherein the reinforcement of each tread comprises two plies, the edges of one being folded around the edges of the other.

7. A pneumatic tire according to claim 1 wherein the tire is formed in two halves, each half being asymmetrical and having a tread, and the two halves forming a symmetrical whole.

* * * * *